G. W. B. SAXTON & W. B. H. FAIRCHILD.
SEPARATOR.
APPLICATION FILED MAY 4, 1910.
1,001,774.
Patented Aug. 29, 1911.
3 SHEETS—SHEET 1.
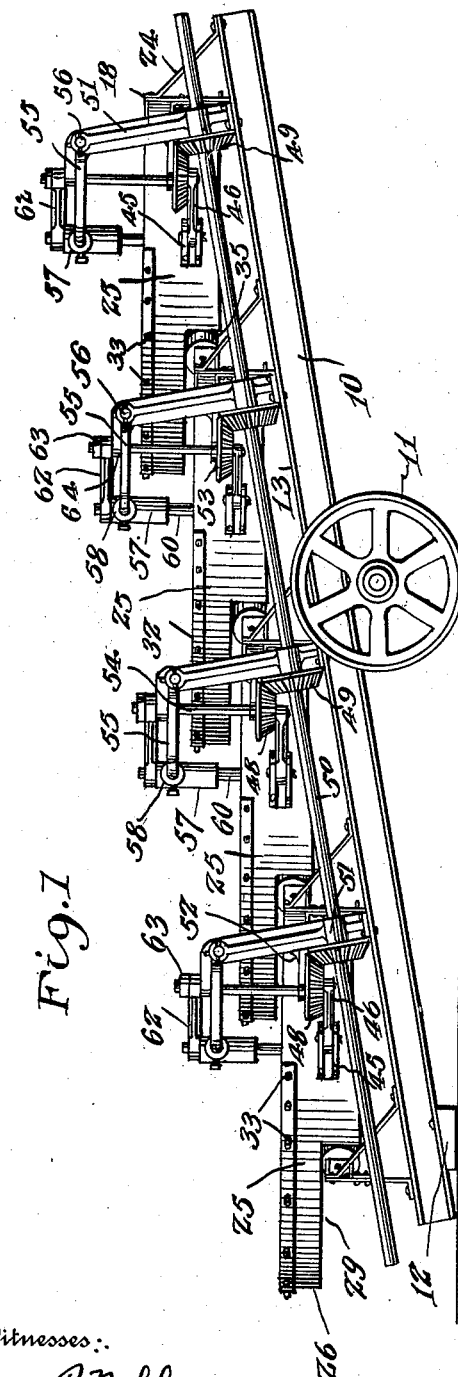
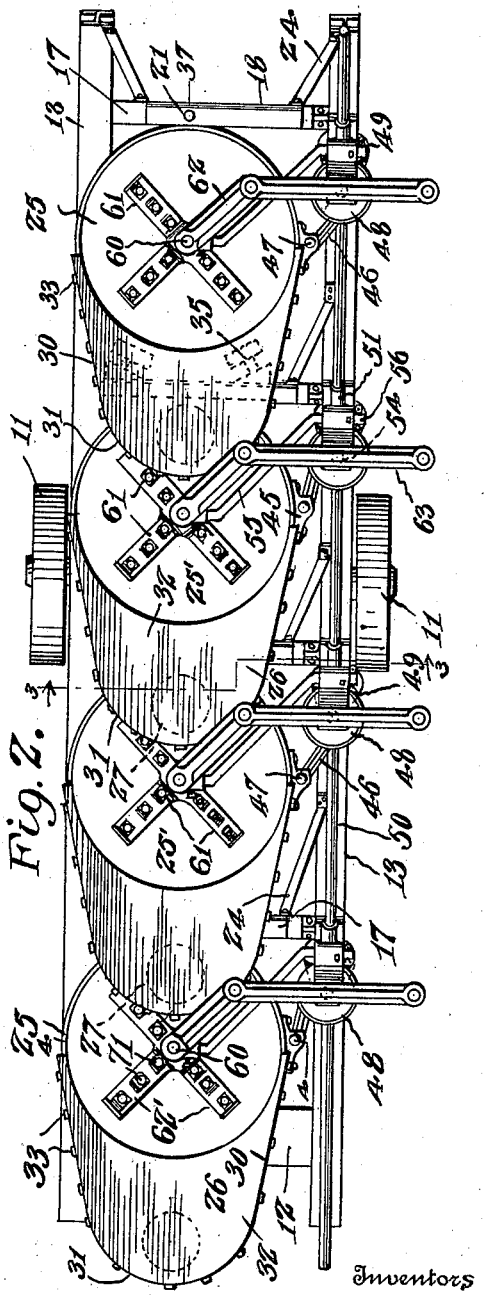
Witnesses:
Joe. P. Mahler.
M. L. Lowv.
Inventors
Wm. B. H. Fairchild
George W. B. Saxton
By Woodward & Chandlee
Attorneys

G. W. B. SAXTON & W. B. H. FAIRCHILD.
SEPARATOR.
APPLICATION FILED MAY 4, 1910.

1,001,774.

Patented Aug. 29, 1911.

3 SHEETS—SHEET 2.

Witnesses:
Jos. P. Wahler,
M. L. Dow.

Inventors
W<sup>m</sup> B. H. Fairchild,
George W. B. Saxton.
By Woodward & Chandlee.
Attorneys.

COLUMBIA PLANOGRAPH CO., WASHINGTON, D. C.

G. W. B. SAXTON & W. B. H. FAIRCHILD.
SEPARATOR.
APPLICATION FILED MAY 4, 1910.
1,001,774.
Patented Aug. 29, 1911.
3 SHEETS—SHEET 3.
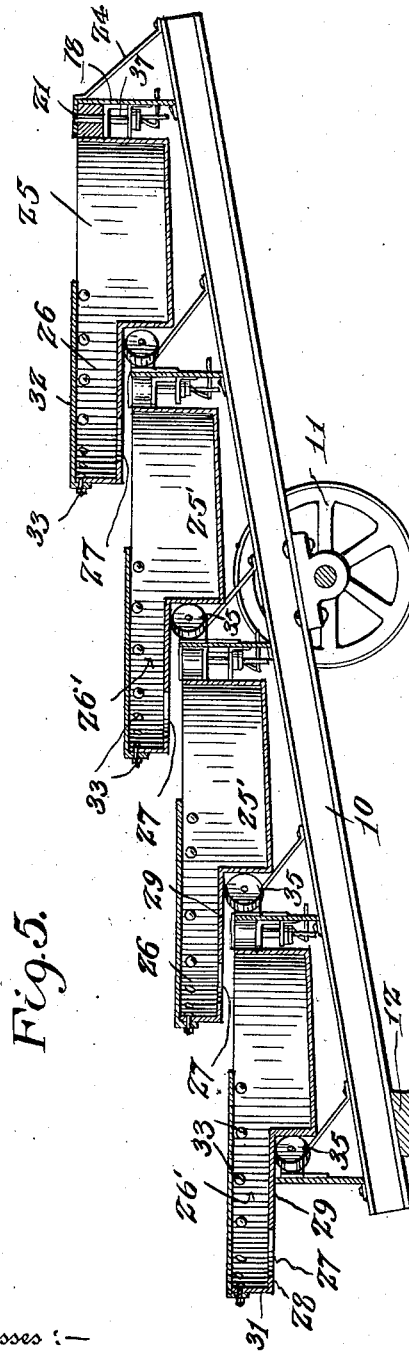
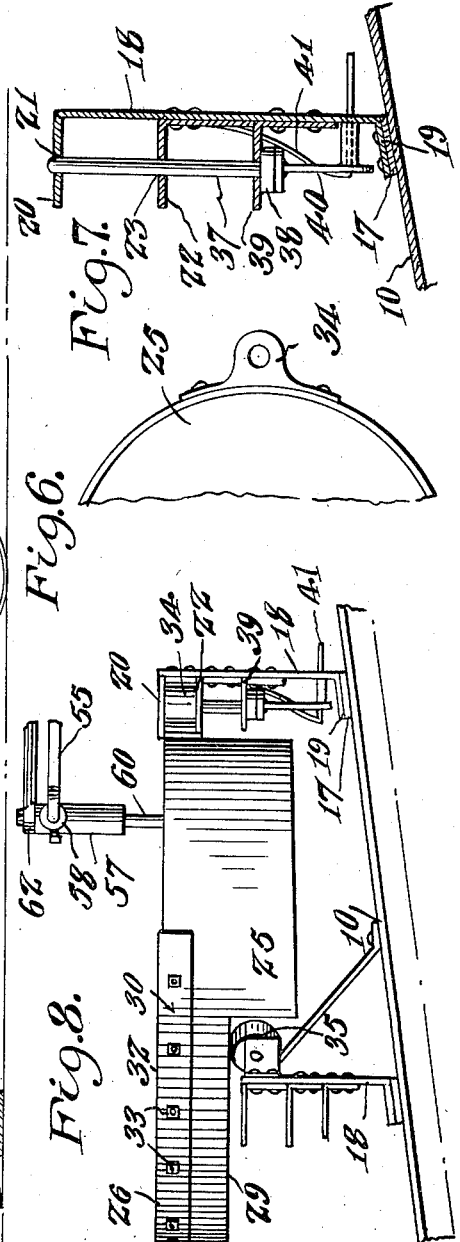
Witnesses:—
Inventors
W<sup>m</sup> B. H. Fairchild,
George W. B. Saxton.
By Woodward & Chandlee.
Attorneys.

UNITED STATES PATENT OFFICE.

GEORGE W. B. SAXTON AND WILLIAM B. H. FAIRCHILD, OF YREKA, CALIFORNIA; SAID FAIRCHILD ASSIGNOR TO SAID SAXTON.

SEPARATOR.

1,001,774.   Specification of Letters Patent.   Patented Aug. 29, 1911.

Application filed May 4, 1910. Serial No. 559,275.

*To all whom it may concern:*

Be it known that we, GEORGE W. B. SAXTON and WILLIAM B. H. FAIRCHILD, citizens of the United States, residing at Yreka, in the county of Siskiyou and State of California, have invented certain new and useful Improvements in Separators, of which the following is a specification.

This invention relates to placer gold recovering apparatus, and more particularly to that type employing a series of receptacles adapted to be agitated with a view to inducing the settling of mineral to the bottom thereof, and allowing earth and non-mineral material to escape from the top thereof.

A particular object of the invention is to provide a novel construction of receptacles of the class mentioned.

A further object is to provide an efficient mechanism for agitating these receptacles.

A very important object is to provide a novel supporting structure for the receptacles.

A further object is to provide a novel means for securing the receptacles in operative position.

Other objects and advantages will be apparent from the following description, and it will be understood that changes in the specific structure shown and described may be made within the scope of the claims without departing from the spirit of the invention.

Figure 3:
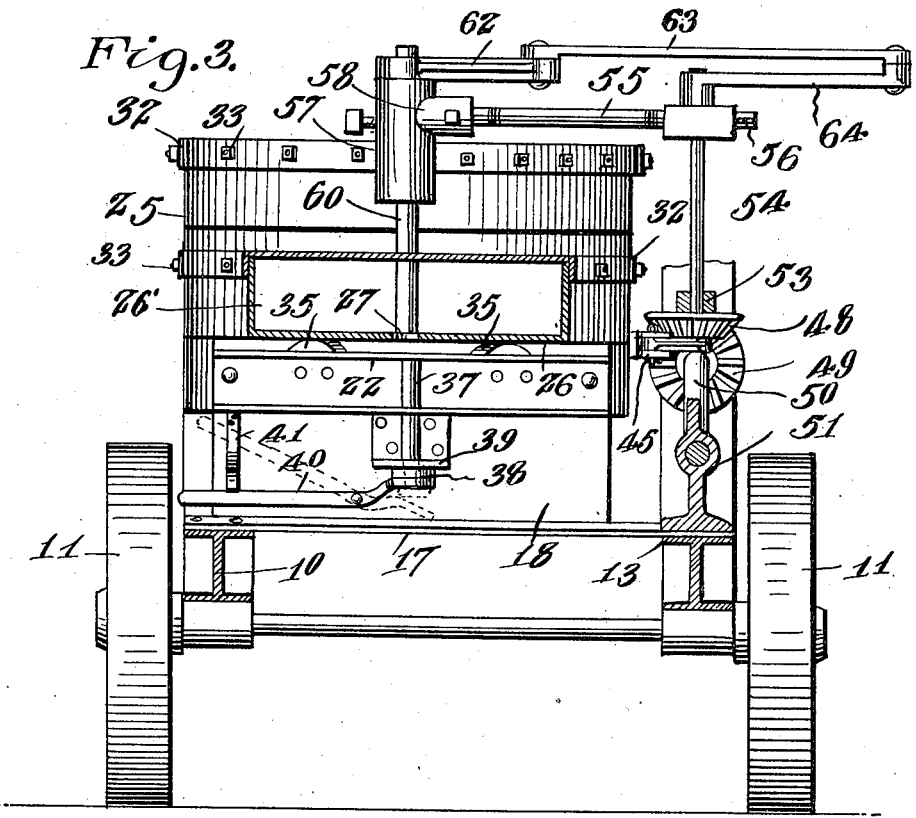
Figure 4:
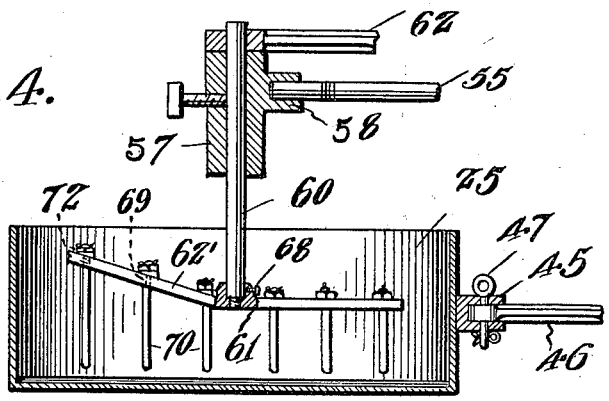

In the drawings: Figure 1 is a side view of the device, Fig. 2 is a top view, Fig. 3 is a transverse section on the line 3—3 of Fig. 2, Fig. 4, is a vertical cross-section through one of the pans, showing the steering mechanism, Fig. 5 is a longitudinal sectional view, Fig. 6 is a detail fragmentary top view of the support connections for the pans, Fig. 7 is a fragmentary longitudinal sectional view of the supporting mechanism, Fig. 8 is a fragmentary side view of one of the pans and connections therefor in inoperative position.

Referring to the drawings, there is shown an inclined framework 10, which may be stationary, or mounted upon a movable support, and as shown is supported by a truck having two wheels 11, the truck being positioned to one side of the center of the device, the long end of the frame resting upon the ground, and being provided with a suitable foot beam 12. The frame comprises the longitudinal stringers 13 and the transverse struts 17, all being preferably formed of angle iron, though they may be formed of wood if found more convenient. On each strut there is carried a suitable wall plate 18 disposed in a vertical plane and having its upper and lower edges turned laterally, the lower edge being secured upon the strut 17, as shown at 19, and the upper edge forming simply an upper retaining flange 20 having a central bolt receiving opening 21 therein. Secured in spaced relation with the flange 20, there is a second supporting flange 22, secured to the plate 18 as shown and having a perforation 23 therein registering with that 21 as shown. The plates 18 are securely braced against lateral movement by suitable members 24. Disposed in each space between the plates 18, there are the circular pans 25, all arranged in stepped formation, each having a laterally projecting extension forming a spout or duct 26 of approximately one-half of the depth of the pans, the space in which forms a continuation of that within the pans. The spout on each pan projects over the next lower adjacent pan, and is provided with a suitable escape opening 27 in the bottom thereof at its extremity having an encircling flange 28 which will prevent the matter escaping therethrough from fouling the adjacent bottom surface of the spout, as will be readily understood. Each of the pans thus comprises the central circular well portion 25' having a plane bottom inclined slightly toward the lower end of the framework, and the duct passage 26'. The spout portions have an approximately level bottom 29 and outwardly convergent side portions 30 extending approximately tangentially with respect to the adjacent circular wall of the well. The outer wall portion of the spout is arcuate as shown at 31, and the spout is provided with a suitable cover 32 conforming to its shape, and secured to the walls of the spout by means of the bolts 33.

The pans are supported in the frame by means of a suitable pivot lug 34 secured upon their upper sides, as shown, and provided with a suitable vertically perforated ear resting upon the flange 22, the perforations registering with those 21 and 23 of the flanges 20 and 22. The opposite side of the pan is supported by means of suitable rollers 35 carried upon wedge shaped blocks secured to the rear sides of the plates 18 adjacent their upper edges with the thickened portions of the blocks disposed outward; the angle of the outer face of the block with respect to the inner face thereof being such as to dispose the wheel 35 in alinement with a path upon the bottom of the spout concentric with the axis of the opening through the ear 34.

Vertically slidable in the openings 21 and 23 through the flanges upon the supporting plates 18, there is a pivot pin 37 having a suitable head 38 at its lower end, the upward movement of which is limited by a suitable stop flange 39 secured to the plate 18 below the flange 22 and having a perforation therethrough receiving the pin, this flange engaging with the head of the pin when at the upper limit of its movement. Pivoted upon the plate 18 outwardly of the flange 39, there is an operating lever 40 suitably engaged with the pin 37 and pivoted intermediately of its length for reciprocation of the pin when oscillated. Carried upon the side of the plate, there is a suitable latch spring 41, arranged to hold the lever at the lower limit of its movement to maintain the pin 37 in secure engagement through the flanges 21 and 23, and the ear 34. This spring comprises an upper S-shaped portion having one end secured against the side of the plate and having its lower end offset outwardly, and having a horizontal inward extension disposed slidably through a suitable perforation in the plate. The lever is normally engaged beneath this horizontal portion against upward movement, but by pressing the spring inwardly the operating end of the lever may be raised as shown in dotted lines in Fig. 3 for lowering of the pin 37.

For the agitation of the pans, there are provided on each the pitman seat lugs 45, to which there is pivotally connected the pitman 46 extended to and engaged upon a suitable wrist pin 47 carried upon the lower face of a horizontal bevel gear 48 meshed with a similar gear 49 carried upon the main driving shaft 50 which extends throughout the length of the framework, at one side, and may be driven by any suitable power means not shown. The shaft 50 is supported by suitable standards 51, carried upon the stringers 13 adjacent each of the pans, and having suitable bearings adjacent their lower ends in which the shaft 50 is supported revolubly, the gears 49 being engaged upon the shaft closely adjacent the lower side of these standards. The standards 51 are inclined slightly, being disposed at right angles to the line of the stringers 13, and have pivoted thereto suitable brackets 52, having vertically spaced horizontal arms 53 carrying vertical revoluble shafts 54 upon the lower ends of which the gears 48 are secured beneath the lower arm 53. Each bracket 52 is supported upon a shaft 55, which has a stub portion 56 engaged through the upper end of the standard 51 and is suitably secured therein, the portion 55 extending diagonally therefrom toward the center of the adjacent pan, where its extremity is again turned inwardly to extend transversely of the framework, and carries a vertical sleeve 57 provided with a laterally extending recessed boss 58 in which the extremity of the shaft 55 is set; a suitable set screw is projected through the side of the boss to engage the extremity of the shaft 55 to hold the sleeve rigidly thereon. Disposed vertically in the sleeve, there is a shaft 60, upon the lower end of which is carried a spider 61 subsequently to be described. Carried at the upper end of the shaft is a horizontal arm 62 to the outer extremity of which is connected a suitable link 63 pivoted to the end of a crank arm 64 carried upon the upper end of the shaft 54. The connections between the link 63 and the crank arms 62 and 64 are preferably of a swivel type to allow the sleeve 57 and the shaft 60 to be lifted upwardly, as will be subsequently described. A similar form of connection may be found desirable between the extremities of the pitman 46 and the wrist pin 47 and the lug 45, though any suitable form of connection may be used at either of these points. The arm 62 upon the shaft 54 is extended toward the upper end of the framework, while the pitman 46 is extended toward the lower end of the framework for connection with the lug 45. By this means when the mechanism operates, rotation of the shaft 54 will produce oscillation in the pans and spiders in opposite directions, the degree of movement being determined by the distance of wrist pin 47 from the axis of the shaft 54, and the length of the crank 64.

This device may be adapted for use in the amalgam process of recovering precious metals, though it is believed preferable for use in placer work or in that method of gold recovery involving the comminution of the metal bearing earth or rock, and the washing of the material with water.

The application of the apparatus will be readily apparent to those versed in the art, and consists in introducing a mixture into the upper tank, during the operation of the machinery, the material being allowed to escape into the lower pans through the spouts and openings therein, and as the material passes through these, the heavier particles will gravitate to the bottom of the pans and toward their lower edges adjacent the entrance to the spout while lighter earth and rock particles will rise and be discharged through the spout under the agitating movement of the pans. After a certain amount of material has passed through the pans, or after a predetermined period of treatment, during which the supply of fresh material to the pans may be discontinued in order that more thorough treatment of the metal bearing matter may be given the pans may be removed from the frame work and the accumulated precious metal removed therefrom.

The removal of the pans is accomplished in the following manner: If all of the pans are to be removed, it may be desirable to stop rotation of the shaft 50, though this is not necessary. If it is desirable to remove the pans without stopping the driving shaft, the brackets 52 are swung outwardly at their lower ends, thus disengaging the gears 48 and 49 and stopping operation of the respective pans, after which the pin 47 is removed, allowing disconnection of the pitman 46, after which the arm 55 may be thrown entirely back, removing the spider 61 from the pans, and upward pressure upon the lever 40 will disengage the pin 37 from the ear 34, leaving the pan free to be removed. The pans should be removed from the side opposite the shaft 50, the ear 34 being slid along on the lower flange 22, the side of the well portion 25′ steering the rollers 35 readily.

The spider 61 comprises a plurality of radial arms 62′ connected at their centers and having a suitable central threaded socket engaged over the reduced threaded end of the shaft 60, a suitable lag screw 68 being projected into the recess and engaging the end of the shaft to prevent casual detachment thereof. Each of the arms is provided with a series of longitudinally spaced openings 69, receiving upwardly therethrough the reduced tenons 70 of stirring fingers 71 vertically pendent from the arms. The tenons are threaded at their upper ends and receive thereover suitable nuts 72 which clamp them securely to the arms, the tenons being also provided with transverse openings receiving cotter pins therethrough to prevent casual disengagement of the nuts.

It will be readily seen from the foregoing that an extremely simple yet unusually efficient apparatus for the recovery of minerals of the class indicated is provided, which may be installed in isolated locations and operated by simple motors. The device may also be manufactured at an extremely low cost, and can be operated by persons of limited mechanical experience.

What is claimed is:

1. In a supporting framework, a plurality of receptacle members supported thereby in stepped relation each having a projecting duct portion leading therefrom and adapted to project over an adjacent lower receptacle for discharge of material from one receptacle to another, said receptacles being pivoted at their sides oppositely of the ducts for oscillation in a horizontal plane a driving shaft extended longitudinally adjacent the receptacles, standards adjacent respective receptacles supporting the shaft, bevel gears upon the shaft adjacent the standards, a crank shaft pivoted to the upper ends of the standards, and having their end portions disposed centrally of adjacent receptacles, a bracket pivoted upon the crank shaft adjacent the upper end of each standard, a vertical shaft carried by each bracket, a gear at the lower end thereof meshed with the first named gears, eccentric connections between the last named gears and sides of adjacent receptacles, a spider member pendent from the outer end of each crank shaft for engagement of material in the adjacent receptacle, a crank connected with the spider member, a crank member carried by the upper end of said vertical shaft and connections between said last named crank member for oscillation of the spider upon rotation of the shaft, as described.

2. A machine of the class described comprising a supporting frame, a plurality of receptacle members disposed thereon in stepped relation and having duct portions projecting laterally therefrom and adapted for discharge of material into an adjacent lower receptacle, each of said receptacles being pivoted at its side opposite the duct, vertical shafts disposed adjacent the respective receptacles, eccentric members operable thereby, pitman connections between one of said eccentric members and the side of respective receptacles for operation of the receptacle, a spider member revoluble within each receptacle, crank portions connected therewith and connections between said crank portions and the other of said eccentric portions connected to the vertical shaft for oscillation of the spider in a direction opposite that of the direction of oscillation of the respective receptacles, and means for rotating said vertical shafts.

In testimony whereof we affix our signatures, in presence of two witnesses.

GEORGE W. B. SAXTON.
WILLIAM B. H. FAIRCHILD.

Witnesses:
JOSEPH W. PHELPS,
RALPH H. LAKE.

---

Copies of this patent may be obtained for five cents each, by addressing the "Commissioner of Patents, Washington, D. C."